United States Patent [19]

Nagasato et al.

[11] Patent Number: 5,715,231
[45] Date of Patent: Feb. 3, 1998

[54] OBJECTIVE LENS DRIVING APPARATUS AND OPTICAL HEAD DRIVING APPARATUS

[75] Inventors: Makoto Nagasato; Mineharu Uchiyama, both of Yokohama; Takahiro Kokubo, Fujisawa, all of Japan

[73] Assignee: Kabushiki Kaisha Toshiba, Kawasaki, Japan

[21] Appl. No.: 576,059

[22] Filed: Dec. 21, 1995

Related U.S. Application Data

[63] Continuation-in-part of Ser. No. 289,663, Aug. 12, 1994, abandoned.

[30] Foreign Application Priority Data

Sep. 14, 1993  [JP]  Japan .................. 5-228745
Dec. 28, 1993  [JP]  Japan .................. 5-334825

[51] Int. Cl.⁶ .................... G11B 7/09; G02B 7/00
[52] U.S. Cl. .................... 369/247; 369/44.16; 359/814
[58] Field of Search .................... 369/247, 248, 369/44.14, 44.15, 44.16, 44.22; 359/814, 824, 813

[56] References Cited

U.S. PATENT DOCUMENTS

| | | | |
|---|---|---|---|
| 4,568,142 | 2/1986 | Iguma | 369/44.16 |
| 4,596,444 | 6/1986 | Ushida | 359/813 |
| 4,891,799 | 1/1990 | Nakano | 369/45 |
| 4,927,235 | 5/1990 | Narumi | 369/44.21 |
| 5,007,712 | 4/1991 | Kikuchi et al. | 369/44.15 |
| 5,046,821 | 9/1991 | Seino | 359/823 |

(List continued on next page.)

FOREIGN PATENT DOCUMENTS

| | | |
|---|---|---|
| 0144445 | 6/1985 | European Pat. Off. . |
| 0376531 | 7/1990 | European Pat. Off. . |
| 0459087 | 12/1991 | European Pat. Off. . |
| 61-48141 | 3/1986 | Japan . |
| 62-78737 | 4/1987 | Japan . |
| 1-251437 | 10/1989 | Japan . |
| 2-29935 | 1/1990 | Japan . |
| 2-308434 | 12/1990 | Japan . |
| 2202405 | 9/1988 | United Kingdom . |
| 9308566 | 4/1993 | WIPO . |
| 9411869 | 5/1994 | WIPO . |

OTHER PUBLICATIONS

Patent Abstracts of Japan, vol. 13, No. 19 (P-814) Jan. 18, 1989 & JP-A-63 224 039 )Matsushita Electric Ind Co Ltd).
Patent Abstracts of Japan, vol. 10, No. 324 (P-512) (2380) Nov. 5, 1986 & JP-A-61 131 243 (Fujitsu Ltd.) Jun. 18, 1986.
Patent Abstracts of Japan, vol. 11, No. 164 (P-580) May 27, 1987 & JP-A-61 296 536 (Canon Inc.) Dec. 27, 1986.
Patent Abstracts of Japan, vol. 10, No. 173 (P-469) (2229) Jun. 18, 1986 & JP-A-61 024 036 (Matsushita Denki Sangyo K.K.).
Patent Abstracts of Japan, vol. 16, No. 430 (P-1417) Sep. 9, 1992 & JP-A-04 147 441 (Sharp Corporation) May 20, 1992.

*Primary Examiner*—Stuart S. Levy
*Assistant Examiner*—David L. Ometz
*Attorney, Agent, or Firm*—Cushman, Darby & Cushman IP Group of Pillsbury Madison & Sutro LLP

[57] ABSTRACT

An objective lens driving apparatus for driving, in a focus direction and a tracking control direction, an objective lens for converging light onto an optical recording medium, includes a lens bobbin for holding the objective lens. The lens bobbin is provided with two types of drive coils for driving the lens bobbin in the focus and tracking control directions. The lens bobbin is attached in a floating state to a magnetic yoke by a pair of suspensions functioning as cantilevers. The magnetic yoke is provided with a magnet for generating a magnetic field. The lens bobbin is situated such that the drive coils are placed within the magnetic field. Each of the suspensions consists essentially of a rectangular metal frame having a plurality of plate spring portions defined in planes perpendicular to the focus and tracking control directions. A number of through holes are formed in the plate spring portions.

14 Claims, 4 Drawing Sheets

U.S. PATENT DOCUMENTS

| | | | |
|---|---|---|---|
| 5,126,983 | 6/1992 | Ikegame et al. | 369/44.14 |
| 5,144,607 | 9/1992 | Ishida et al. | 369/44.15 |
| 5,146,441 | 9/1992 | Akiba et al. | 369/44.15 |
| 5,161,067 | 11/1992 | Tomiyama et al. | 369/44.16 |
| 5,206,849 | 4/1993 | Yamamoto et al. | 369/44.16 |
| 5,220,459 | 6/1993 | Ichikawa et al. | 369/44.14 |
| 5,313,334 | 5/1994 | Tomiyama et al. | 369/44.16 |
| 5,467,328 | 11/1995 | Murakami et al. | 369/44.16 |
| 5,475,661 | 12/1995 | Tomita et al. | 369/44.16 |
| 5,488,603 | 1/1996 | Tomita et al. | 369/44.16 |

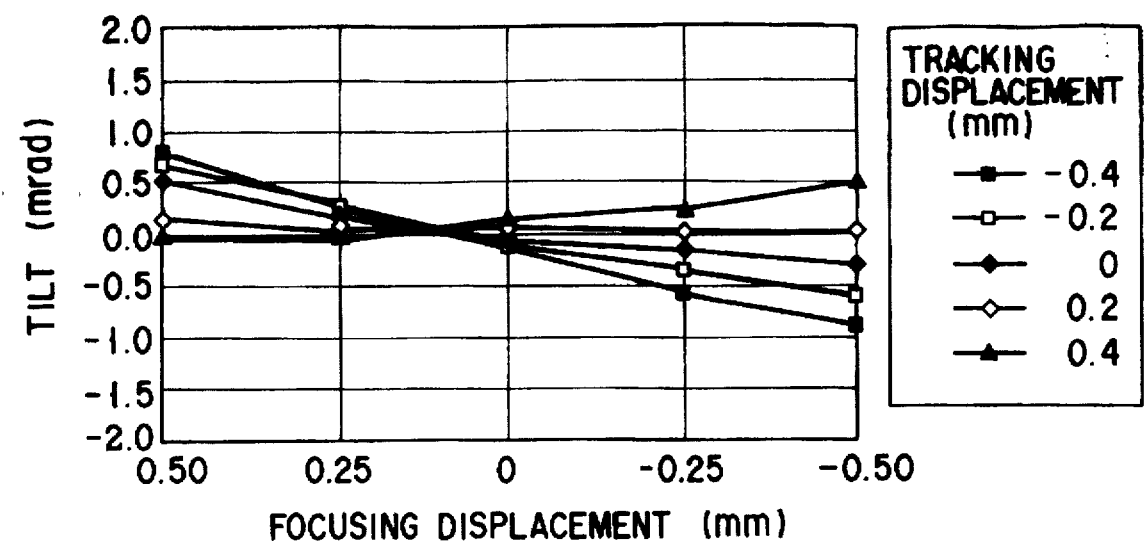
F I G. 6
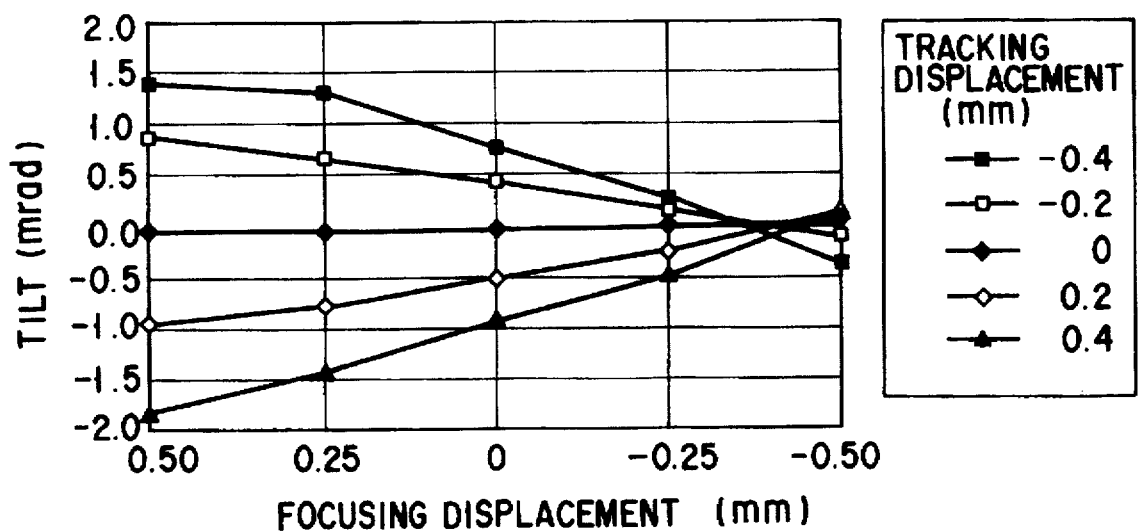
F I G. 7

OBJECTIVE LENS DRIVING APPARATUS AND OPTICAL HEAD DRIVING APPARATUS

CROSS-REFERENCES TO THE RELATED APPLICATIONS

This application is a continuation-in-part of U.S. patent application Ser. No. 08/289,663, filed Aug. 12, 1994, now abandoned.

BACKGROUND OF THE INVENTION

1. Field of the Invention

The present invention relates to an objective lens driving apparatus and an optical head driving apparatus for use in an optical information recording/reproducing apparatus for recording and/or reproducing an information signal on an optical recording medium such as an optical disk, etc.

2. Description of the Related Art

An optical pickup device has conventionally been used as means for radiating a light beam on a signal recording surface of an optical disk, which is mounted on and rotated by a disk driving apparatus, thereby reading an information signal recorded on the optical disk or writing a predetermined information signal on the optical disk. In an already proposed structure of such an optical pickup device, a light source such as a semiconductor laser element is provided, and a light beam emitted from the light source is focused on a signal recording surface of an optical disk serving as an optical recording medium via predetermined devices such as a collimator lens and a beam splitter and an objective lens. The light beam reflected from the signal recording surface is detected by a photodetector, thus write and/or read of an information signal on the signal recording surface is effected.

In the optical pickup device, the objective lens is provided with an objective lens driving apparatus for moving the objective lens by an electromagnetic driving force in two directions, i.e. an optical axis direction (or a "focus direction") and a direction perpendicular to the optical axis (or a "track width or tracking control direction"). Thereby, the light beam is focused on the signal recording surface and scans recording tracks, exactly.

An example of an objective lens supporting member for supporting an objective lens movably in two directions is a structure wherein a lens bobbin, to which an objective lens is attached, is movably supported by support arms comprising four round rod members, as disclosed in Jap. U.M. Appln. KOKAI Publication No. 1-24524, or support arms constituted by combining parallel plate springs perpendicularly as disclosed in Jap. Pat. Appln. KOKAI Publication No. 2-179932.

In the objective lens driving apparatus including such support arms, the objective lens is moved on the basis of an output from a photodetector, thereby to carry out so-called "focus servo" and "tracking servo."

The focus servo enables a light beam to be exactly focused on a signal recording surface at all times, even if so-called surface fluctuation occurs while an optical disk is being rotated. Accordingly, while the focus servo is effected, the objective lens is moved so that the distance between the objective lens and the optical disk is always kept at a predetermined value.

On the other hand, the tracking servo enables a beam spot formed by a focused light beam to be exactly traced on a recording track formed on the signal recording surface, even if so-called center displacement occurs while the optical disk is being rotated.

SUMMARY OF THE INVENTION

An object of the present invention is to provide an objective lens driving apparatus and an optical head driving apparatus, which have a simple structure and prevent occurrence of high-order resonance.

Another object of the present invention is to provide an objective lens driving apparatus and an optical head driving apparatus, which have an excellent tilt characteristic of the movable section.

According to a first aspect of the present invention, there is provided an objective lens driving apparatus for driving, in a first direction along an optical axis and in a second direction perpendicular to the first direction, an objective lens for converging light onto an optical recording medium, thereby to perform at least one of an operation of information recording on the optical recording medium and an operation of information reproduction from the optical recording medium, the objective lens driving apparatus comprising:

a lens bobbin for holding the objective lens;

a first drive coil, provided on the lens bobbin, for driving the objective lens in the first direction;

a second drive coil, provided on the lens bobbin, for driving the objective lens in the second direction;

a magnetic field generating mechanism for generating a magnetic field to apply a drive force to the lens bobbin, in cooperation with electric current supplied to the first and second drive coils;

a base frame for supporting the magnetic field generating mechanism;

a supporting head arranged on the base frame;

a pair of suspensions serving as cantilevers for connecting the lens bobbin to the supporting head such that the lens bobbin is in a floating state and the first and second drive coils are situated in the magnetic field, the suspensions being coupled to the lens bobbin at two mutually facing positions, wherein each of the suspensions comprises a rectangular metal frame formed of a pair of first plate spring portions defined in a plane perpendicular to the second direction and a pair of second plate spring portions defined in a plane perpendicular to the first direction, and a number of through holes are formed in the first and second plate spring portions in order to allow the first and second plate spring portions to have a decreased flexural rigidity.

According to a second aspect of the present invention, there is provided an optical head driving apparatus for driving, in a first direction along an optical axis and in a second direction perpendicular to the first direction, an optical head having at least an objective lens, a semiconductor laser element, and a photodetector, for performing at least one of an operation of information recording on the optical recording medium and an operation of information reproduction from the optical recording medium, the optical head driving apparatus comprising:

a first drive coil, provided on the optical head, for driving the objective lens in the first direction;

a second drive coil, provided on the optical head, for driving the objective lens in the second direction;

a magnetic field generating mechanism for generating a magnetic field to apply a drive force to the optical head, in cooperation with electric current supplied to the first and second drive coils;

a base frame for supporting the magnetic field generating mechanism;

a supporting head arranged on the base frame;

a pair of suspensions serving as cantilevers for connecting the optical head to the supporting head such that the optical head is in a floating state and the first and second drive coils are situated in the magnetic field, the suspensions being coupled to the optical head at two mutually facing positions, wherein each of the suspensions comprises a rectangular metal frame formed of a pair of first plate spring portions defined in a plane perpendicular to the second direction and a pair of second plate spring portions defined in a plane perpendicular to the first direction, and a number of through holes are formed in the first and second plate spring portions in order to allow the first and second plate spring portions to have a decreased flexural rigidity.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 6 is a graph showing a tilt characteristic of the driving apparatus shown in FIG. 4, where the spring constants of the tracking control direction and focus direction are 75 N/m and 57 N/m, respectively; and FIG. 7 is a graph showing a tilt characteristic of the driving apparatus shown in FIG. 4, where the spring constants of the tracking control direction and focus direction are 57 N/m and 57 N/m, respectively.

DETAILED DESCRIPTION OF THE PREFERRED EMBODIMENTS

Figure 1:
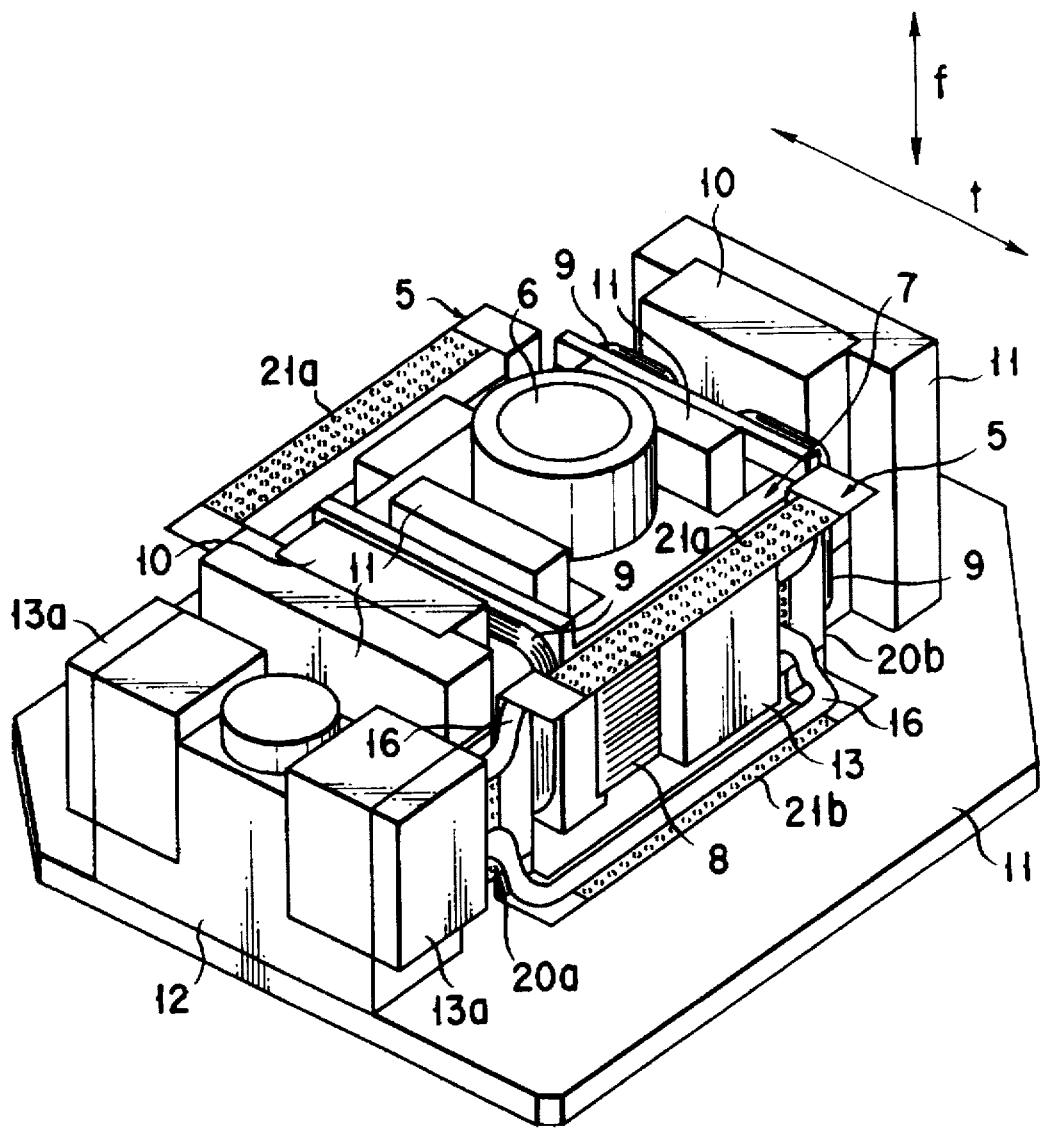
FIG. 1 is a perspective view showing an objective lens driving apparatus according to an embodiment of the present invention.

FIG. 1 is a perspective view showing an objective lens driving apparatus according to an embodiment of the present invention. This apparatus comprises an objective lens 6 supported by a lens bobbin 7, and a pair of suspensions 5 for flexibly supporting the lens bobbin 7 in a floating state. The lens bobbin 7 is provided with a focus coil 8 and tracking coils 9 as two-directional drive coils. The focus coil 8 is horizontally wound around the lens bobbin 7. The tracking coils 9 comprise four ring-shaped coils which are provided, two by two, on two opposed side surfaces of the lens bobbin 7.

The lens bobbin 7 is supported on a frame-shaped magnetic yoke 11 by the pair of suspensions 5 serving as cantilevers. A support member 12 is formed on the magnetic yoke 11, and the suspensions 5 are fixed on the support member 12. The drive coils 8 and 9 are situated between one of two magnets 10 and magnetic yoke 11 and form a magnetic circuit.

Electric current is supplied to the drive coils 8 and 9 via printed wiring members 16 formed separately from the suspensions 5. By supplying drive current to the drive coils 8 and 9 via the printed wiring members 16, the lens bobbin 7 can be driven in two mutually perpendicular directions.

Each suspension 5 comprises a rectangular frame formed integrally of stainless steel. Each suspension 5 includes a pair of vertical portions 20a and 20b and a pair of horizontal portions 21a and 21b. The horizontal portions 21a and 21b are bent at right angles to the vertical portions 20a and 20b. The vertical portions 20a and 20b and horizontal portions 21a and 21b function as plate springs which are flexible at the time of driving the lens bobbin 7 in the tracking control direction (indicated by arrow t in FIG. 1) and focus direction (indicated by arrow f).

As is shown in FIG. 1, the vertical portion 20a is connected to support member 12 by means of a fixing member 13a while the vertical portion 20b is connected to the lens bobbin 7 by means of a fixing member 13b. The fixing members 13a and 13b may comprise any type of fixing means such as a screw, adhesive, etc., only if it can firmly fix the suspension 5 to the lens bobbin 7 and support member 12.

A number of through holes 25 are formed in effective spring portions 22 of the vertical portions 20a and 20b and horizontal portions 21a and 21b. The through holes 25 are formed in each of spring portions 22 at an opening rate of from 30% to 70%. By virtue of the many holes 25, the flexural rigidity of each of the vertical portions 20a and 20b and horizontal portion 21a and 21b can be low enough even if the thickness of stainless steel, of which the suspension 5 is formed, is increased.

Figure 3:
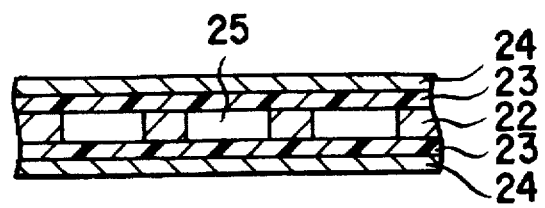
FIG. 3 is a partial cross-sectional view of the suspensions shown in FIGS. 2 and 5.

Laminar visco-elastic bodies 23, e.g., VEM (trade name: Scotch Co.), are bonded to both surfaces of each effective spring portion 22 of the vertical and horizontal portions, as shown in FIG. 3. A holding plate 24 of aluminum is bonded to the visco-elastic body 23. By virtue of the damping effect of the visco-elastic body 23, a peak of principal resonance can be reduced to a range of from 5 dB to 15 dB, and the bobbin 7 of the objective lens can be driven with no high-order resonance and with good responsiveness to a control drive current.

The support member 12 is attached to the magnetic yoke 11, and supports the suspensions 5. In the present embodiment, the suspensions 5 are attached on both sides of the lens bobbin 7 so as to support the objective lens 6. The focus coil 8 and tracking coils 9 provided on the lens bobbin 7, supported by the suspensions 5, are arranged to face the magnet 10 within the magnetic yoke 11. The magnet 10 and magnetic yoke 11 constitute a magnetic circuit.

Accordingly, a predetermined focus drive current is supplied to the focus coil 8, whereby the objective lens 6, which is movably supported by the suspensions 5 in the two axial directions, is moved within the magnetic yoke 11 along with the lens bobbin 7 in the optical axial direction of the objective lens 6 (indicated by arrow f in FIG. 1), i.e., in the focus direction. On the other hand, a predetermined tracking drive current is supplied to the tracking coils 9, whereby the lens bobbin 7 is moved in a direction (indicated by arrow t in FIG. 1) perpendicular to the optical axis of the objective lens 6, i.e., in the track width direction (tracking control direction).

Figure 2:
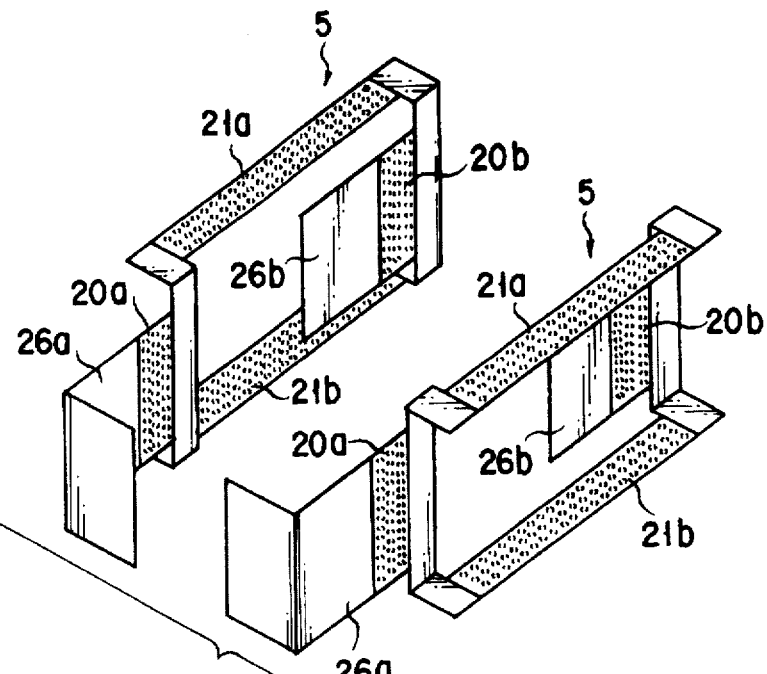
FIG. 2 is a perspective view showing the suspensions of the driving apparatus shown in FIG. 1.

FIG. 2 shows the suspensions 5 detached from the driving apparatus. As shown in FIG. 2, one horizontal portion 21a connects respective upper sides of the vertical portions 20a and 20b, while the other horizontal portion 21b connects respective lower sides of the vertical portions 20a and 20b, so that the suspension 5 has a rectangular shape. A pair of plate springs formed of the horizontal portions 21a and 21b are defined in planes perpendicular to the focus direction, while a pair of plate springs formed of the vertical portions 20a and 20b are defined in a plane perpendicular to the tracking control direction.

One vertical portion 20a extends away from the horizontal portions 21a and 21b from its part connected to the horizontal portions 21a and 21b, and is fixed at its end blank 26a to the support member 12. In other words, the vertical portion 20a functions as a plate spring on the fixed-end side. The other vertical portion 20b extends between the horizontal portions 21a and 21b from its part connected to the horizontal portions 21a and 21b, and is attached at its end blank 26b to the lens bobbin 7. In other words, the vertical portion 20b functions as a plate spring on the free-end side.

The suspension 5 having a bent rectangular shape is formed by bending the paired horizontal portions 21a and 21b in parallel to each other at right angles to the paired vertical portions 20a and 20b. Thereby, the suspension 5 becomes movable in the two axial directions, and the objective lens support member with a very simple structure can be obtained.

The main part of the suspension 5 is formed of a bent metal plate which is made of a uniform material such as stainless steel, copper, beryllium copper, phosphorus bronze, or the like. The vertical and horizontal portions of the suspension 5, which are movable in the two axial directions, respectively, are formed of the same material. Therefore, the resonance frequency is constant in the entire suspension 5 and occurrence of partial detrimental resonance can be prevented.

Moreover, since the vertical and horizontal portions of the suspension 5 are movable, respectively, only in the mutually perpendicular directions, torsion or warping of the suspension 5 can be prevented at the time of driving the lens bobbin 7. Thus, the responsiveness of the suspension 5 can be enhanced.

Therefore, by supplying a predetermined current to the driving coils, the lens bobbin 7 is moved to a predetermined position and the focus servo and tracking servo can be carried out exactly.

Figure 4:
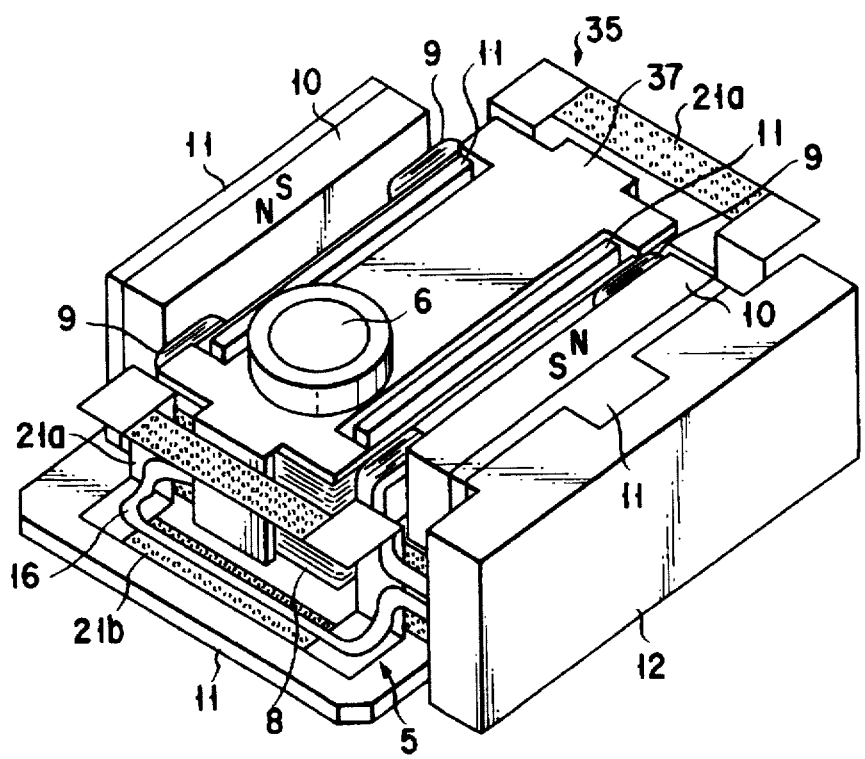
FIG. 4 is a perspective view showing an optical head driving apparatus according to another embodiment of the present invention.

FIG. 4 is a perspective view showing an optical head driving apparatus according to another embodiment of the present invention. An integrated optical head 37 for recording and/or reproducing an information signal contains at least an objective lens 6, a semiconductor laser element and a photodetector. In this embodiment, the optical head 37 further contains a collimator lens, a beam splitter, a prism, a hologram optical element, etc.

This apparatus comprises a pair of suspensions 35 for flexibly supporting the optical head 37 in a floating state. The optical head 37 is provided with a focus coil 8 and tracking coils 9 as two-directional drive coils. The focus coil 8 is horizontally wound around the optical head 37. The tracking coils 9 comprise four ring-shaped coils which are provided, two by two, on two opposed side surfaces of the optical head 37.

The optical head 37 is supported on a frame-shaped magnetic yoke 11 by the pair of suspensions 35 serving as cantilevers. A support member 12 is formed on the magnetic yoke 11, and the suspensions 35 are fixed on the support member 12. The drive coils 8 and 9 are situated between one of two magnets 10 and magnetic yoke 11 and form a magnetic circuit.

Electric current is supplied to the drive coils 8 and 9 via printed wiring members 16 formed separately from the suspensions 35. By supplying drive current to the drive coils 8 and 9 via the printed wiring members 16, the optical head 37 can be driven in two mutually perpendicular directions.

Each suspension 35 comprises a rectangular frame formed integrally of stainless steel. Each suspension 35 includes a pair of vertical portions 20a and 20b and a pair of horizontal portions 21a and 21b. The horizontal portions 21a and 21b are bent at right angles to the vertical portions 20a and 20b. The vertical portions 20a and 20b and horizontal portions 21a and 21b function as plate springs which are flexible at the time of driving the optical head 37 in the tracking control direction (indicated by arrow t in FIG. 4) and focus direction (indicated by arrow f).

As is shown in FIG. 4, the vertical portion 20a is connected to support member 12 by means of a fixing member 13a while the vertical portion 20b is connected to the optical head 37 by means of a fixing member 13b. The fixing members 13a and 13b may comprise any type of fixing means such as a screw, adhesive, etc., only if it can firmly fix the suspension 35 to the optical head 37 and support member 12.

A number of through holes 25 are formed in effective spring portions 22 of the vertical portions 20a and 20b and horizontal portions 21a and 21b. The through holes 25 are formed in each of spring portions 22 at an opening rate of from 30% to 70%. By virtue of the many holes 25, the flexural rigidity of each of the vertical portions 20a and 20b and horizontal portion 21a and 21b can be low enough even if the thickness of stainless steel, of which the suspension 35 is formed, is increased.

Laminar visco-elastic bodies 23, e.g., VEM (trade name: Scotch Co.), are bonded to both surfaces of each effective spring portion 22 of the vertical and horizontal portions, as shown in FIG. 3. A holding plate 24 of aluminum is bonded to the visco-elastic body 23. By virtue of the damping effect of the visco-elastic body 23, a peak of principal resonance can be reduced to a range of from 5 dB to 15 dB, and the bobbin 7 of the objective lens can be driven with no high-order resonance and with good responsiveness to a control drive current.

The support member 12 is attached to the magnetic yoke 11, and supports the suspensions 35. In the present embodiment, the suspensions 35 are attached on both sides of the optical head 37 so as to support the optical head 37. The focus coil 8 and tracking coils 9 provided on the optical head 37, supported by the suspensions 35, are arranged to face the magnet 10 within the magnetic yoke 11. The magnet 10 and magnetic yoke 11 constitute a magnetic circuit.

Accordingly, a predetermined focus drive current is supplied to the focus coil 8, whereby the optical head 37, which is movably supported by the suspensions 35 in the two axial directions, is moved within the magnetic yoke 11 in the optical axial direction of the objective lens 6 (indicated by arrow f in FIG. 4), i.e., in the focus direction. On the other hand, a predetermined tracking drive current is supplied to the tracking coils 9, whereby the optical head 37 is moved in a direction (indicated by arrow t in FIG. 4) perpendicular to the optical axis of the objective lens 6, i.e., in the track width direction (tracking control direction).

Figure 5:
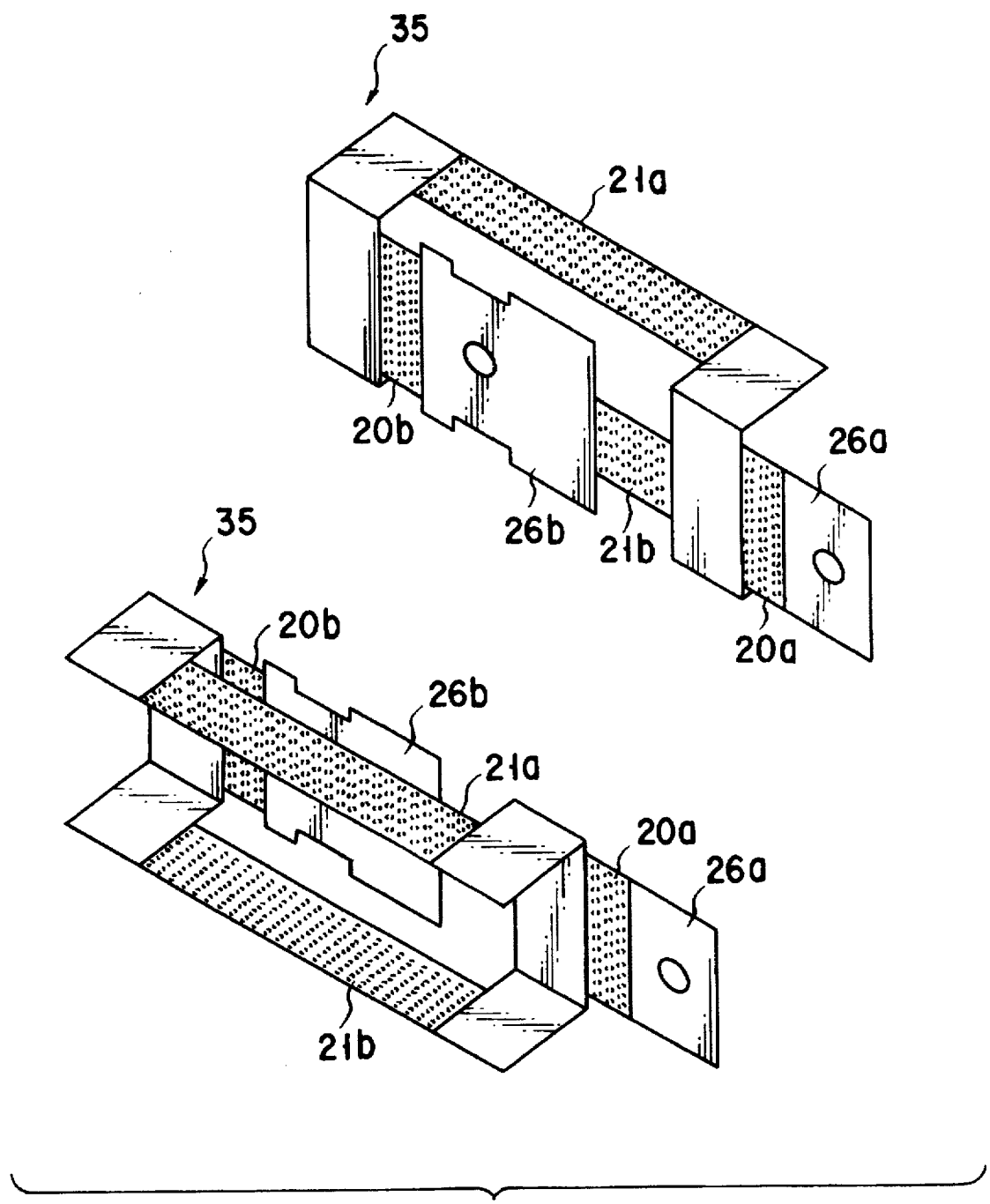
FIG. 5 is a perspective view showing the suspensions of the driving apparatus shown in FIG. 4.

FIG. 5 shows the suspensions 35 detached from the driving apparatus. As shown in FIG. 5, one horizontal portion 21a connects respective upper sides of the vertical portions 20a and 20b, while the other horizontal portion 21b connects respective lower sides of the vertical portions 20a and 20b, so that the suspension 35 has a rectangular shape. A pair of plate springs formed of the horizontal portions 21a and 21b are defined in planes perpendicular to the focus direction, while a pair of plate springs formed of the vertical portions 20a and 20b are defined in a plane perpendicular to the tracking control direction.

One vertical portion 20a extends away from the horizontal portions 21a and 21b from its part connected to the horizontal portions 21a and 21b, and is fixed at its end blank 26a to the support member 12. In other words, the vertical portion 20a functions as a plate spring on the fixed-end side. The other vertical portion 20b extends between the horizontal portions 21a and 21b from its part connected to the horizontal portions 21a and 21b, and is attached at its end blank 26b to the optical head 37. In other words, the vertical portion 20b functions as a plate spring on the free-end side.

The suspension 35 having a bent rectangular shape is formed by bending the paired horizontal portions 21a and 21b in parallel to each other at right angles to the paired vertical portions 20a and 20b. Thereby, the suspension 35 becomes movable in the two axial directions, and the objective lens support member with a very simple structure can be obtained.

The main part of the suspension 35 is formed of a bent metal plate which is made of a uniform material such as stainless steel, copper, beryllium copper, phosphorus bronze, or the like. The vertical and horizontal portions of the suspension 35, which are movable in the two axial directions, respectively, are formed of the same material. Therefore, the resonance frequency is constant in the entire suspension 35 and occurrence of partial detrimental resonance can be prevented.

Moreover, since the vertical and horizontal portions of the suspension 35 are movable, respectively, only in the mutually perpendicular directions, torsion or warping of the suspension 35 can be prevented at the time of driving the optical head 37. Thus, the responsiveness of the suspension 35 can be enhanced.

Therefore, by supplying a predetermined current to the driving coils, the optical head 37 is moved to a predetermined position and the focus servo and tracking servo can be carried out exactly.

In the suspensions 5 and 35, the spring constant in the tracking control direction, provided substantially by the vertical portions 20a and 20b, and the spring constant in the focus direction, provided substantially by the horizontal portions 21a and 21b, differ from each other on the basis of the reasons described later. The difference in the spring constants is set to fall in a range of from 10% to 40%. This range was decided in consideration of the results of experiments conducted by the present inventors in relation to a driving apparatus as shown in FIG. 4.

The lens bobbin 7, i.e., the movable unit is driven in the focus and tracking control directions by means of supplying a predetermined driving current to the focus and tracking coils 8 and 9, respectively. For example, when a driving force in the focus direction is applied to the movable unit by supplying an electrical power to the focus coil 8 under a state where the movable unit has been displaced in the tracking control direction by supplying an electrical power to the tracking coils 9, the driving force in the focus direction acts on a position, which is distant from the gravity center of the movable unit by the displacement of the movable unit in the tracking control direction. Subsequently, an angular moment is generated about the gravity center of the movable unit in an amount obtained by multiplying the driving force in the focus direction by the displacement in the tracking control direction. The angular moment results in a tilt of the movable unit.

The present inventors analyzed the effect of the angular moments in both the focus and tracking control directions on the tilt of the movable unit. As a result, it has been found that the angular moments in both directions act on the tilt of the movable unit such that they counteract each other. In other words, the tilt of the movable unit can be reduced by adjusting the degrees of the angular moments in both the directions, which is performed by changing the spring constant provided substantially by the vertical portions 20a and 20b in the tracking control direction, and the spring constant provided substantially by the horizontal portions 21a and 21b in the focus direction.

FIGS. 6 and 7 shows dependence of tilt angles of the movable unit on the focusing displacement, as results of experiments conducted under different conditions in the driving apparatus shown in FIG. 4. In FIGS. 6 and 7, the tilt angle represents the angle relative to the ideal optical axis, and the tracking displacement is used as a parameter.

In the experiments in relation to FIG. 6, the spring constants in the tracking control direction and focus direction were set at 75 N/m and 57 N/m, respectively. In the experiments in relation to FIG. 7, the spring constants in tracking control direction and focus direction were set at 57 N/m and 57 N/m, respectively.

As shown in FIGS. 6 and 7, the tilt angle of the movable unit was smaller where the spring constants in the tracking control direction and focus direction differed from each other. Other experiments were conducted with various values of the spring constants in the tracking control direction and focus direction. As a result, it has been established that a desirable tilt characteristic can be obtained by setting the difference in the spring constants to fall in a range of from 10% to 40%.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An objective lens driving apparatus for driving, in a first direction along an optical axis and in a second direction perpendicular to the first direction, an objective lens for converging light onto an optical recording medium, thereby to perform at least one of an operation of information recording on the optical recording medium and an operation of information reproduction from the optical recording medium, said objective lens driving apparatus comprising:

a lens bobbin for holding said objective lens;

a first drive coil, provided on said lens bobbin, for driving said objective lens in said first direction;

a second drive coil, provided on said lens bobbin, for driving said objective lens in said second direction;

a magnetic field generating mechanism for generating a magnetic field to apply a drive force to said lens bobbin, in cooperation with electric current supplied to said first and second drive coils;

a base frame for supporting said magnetic field generating mechanism;

a supporting head arranged on said base frame;

a pair of suspensions serving as cantilevers for connecting said lens bobbin to said supporting head such that said lens bobbin is in a floating state and said first and second drive coils are situated in said magnetic field, said suspensions being coupled to said lens bobbin at two mutually facing positions, wherein each of said suspensions comprises a rectangular metal frame formed of a pair of first plate spring portions defined in a plane perpendicular to said second direction and a pair of second plate spring portions defined in a plane perpendicular to said first direction, and a number of through holes are formed in said first and second plate spring portions in order to allow said first and second plate spring portions to have a decreased flexural rigidity, and wherein each of said suspensions has spring constants different from each other in said first and second directions, such that the spring constant in said second direction is greater than the spring constant in said first direction, in order to decrease a tilt of said lens bobbin due to angular moments in said first and second directions, and a difference between the spring constants in said first and second directions is set to fall in a range of from 10% to 40%.

2. The apparatus according to claim 1, wherein said pair of suspensions have substantially mutually symmetrical shapes and are arranged substantially in line-symmetry.

3. The apparatus according to claim 2, wherein said rectangular metal time is formed of a single metal plate which has been processed and bent, wherein one of said second plate spring portions connects respective upper sides of said first plate spring portions while the other of said second plate spring portions connects respective lower sides of said first plate spring portions, and wherein said first plate spring portions comprise a fixed-end-side first plate spring portion extending away from said second plate spring portions from a part connected to said second plate spring portions, said fixed-end-side first plate spring portion being attached at an end to said supporting head, and a free-end-side first plate spring portion extending between said second plate spring portions from a part connected to said second plate spring portions, said free-end-side first plate spring portion being attached to said lens bobbin between said second plate spring portions.

4. The apparatus according to claim 3, wherein said through holes are formed in each of said first and second plate spring portions at an opening rate of from 30% to 70%.

5. The apparatus according to claim 4, wherein said rectangular metal frame is made of a material selected from a group consisting of stainless steel, copper, beryllium copper, and phosphorus bronze.

6. The apparatus according to claim 1, further comprising a visco-elastic layer arranged on each of said first and second plate spring portions, for damping vibration of each of said suspensions.

7. An optical head driving apparatus for driving, in a first direction along an optical axis and in a second direction perpendicular to the first direction, an optical head having at least an objective lens, a semiconductor laser element, and a photodetector, for performing at least one of an operation of information recording on the optical recording medium and an operation of information reproduction from the optical recording medium, said optical head driving apparatus comprising:

a first drive coil, provided on said optical head, for driving said objective lens in said first direction;

a second drive coil, provided on said optical head, for driving said objective lens in said second direction;

a magnetic field generating mechanism for generating a magnetic field to apply a drive force to said optical head, in cooperation with electric current supplied to said first and second drive coils;

a base frame for supporting said magnetic field generating mechanism;

a supporting head arranged on said base frame;

a pair of suspensions serving as cantilevers for connecting said optical head to said supporting head such that said optical head is in a floating state and said first and second drive coils are situated in said magnetic field, said suspensions being coupled to said optical head at two mutually facing positions, wherein each of said suspensions comprises a rectangular metal frame formed of a pair of first plate spring portions defined in a plane perpendicular to said second direction and a pair of second plate spring portions defined in a plane perpendicular to said first direction, and a number of through holes are formed in said first and second plate spring portions in order to allow said first and second plate spring portions to have a decreased flexural rigidity, and wherein each of said suspensions has spring constants different from each other in said first and second directions, such that the spring constant in said second direction is greater than the spring constant in said first direction, in order to decrease a tilt of said optical head due to angular moments in said first and second directions, and a difference between the spring constants in said first and second directions is set to fall in a range of from 10% to 40%.

8. The apparatus according to claim 7, wherein said pair of suspensions have substantially mutually symmetrical shapes and are arranged substantially in line-symmetry.

9. The apparatus according to claim 7, wherein said rectangular metal frame is formed of a single metal plate which has been processed and bent, wherein one of said second plate spring portions connects respective upper sides of said first plate spring portions while the other of said second plate spring portions connects respective lower sides of said first plate spring portions, and wherein said first plate spring portions comprise a fixed-end-side first plate spring portion extending away from said second plate spring portions from a part connected to said second plate spring portions, said fixed-end-side first plate spring portion being attached at an end to said supporting head, and a free-end-side first plate spring portion extending between said second plate spring portions from a part connected to said second plate spring portions, said free-end-side first plate spring portion being attached to said optical head between said second plate spring portions.

10. The apparatus according to claim 9, wherein said through holes are formed in each of said first and second plate spring portions at an opening rate of from 30% to 70%.

11. The apparatus according to claim 10, wherein said rectangular metal frame is made of a material selected from a group consisting of stainless steel, copper, beryllium copper, and phosphorus bronze.

12. The apparatus according to claim 7, further comprising a visco-elastic layer arranged on each of said first and second plate spring portions, for damping vibration of each of said suspensions.

13. An objective lens driving apparatus for driving, in a first direction along an optical axis and in a second direction perpendicular to the first direction, an objective lens for converging light onto an optical recording medium, thereby to perform at least one of an operation of information recording on the optical recording medium and an operation of information reproduction from the optical recording medium, said objective lens driving apparatus comprising:

a lens bobbin for holding said objective lens;

a pair of suspensions serving as cantilevers for connecting said lens bobbin to a support such that said lens bobbin is maintained in a floating state;

wherein each of said suspensions comprises a rectangular metal frame formed of a pair of first plate spring portions defined in a plane perpendicular to said second direction and a pair of second plate spring portions defined in a plane perpendicular to said first direction, and a number of through holes are formed in said first and second plate spring portions in order to allow said first and second plate spring portions to have a decreased flexural rigidity, and wherein each of said suspensions has spring constants different from each other in said first and second directions, such that the spring constant in said second direction is greater than the spring constant in said first direction, in order to decrease a tilt of said lens bobbin due to angular moments in said first and second directions, and a difference between the spring constants in said first and second directions is set to fall in a range of from 10% to 40%.

14. An optical head driving apparatus for driving, in a first direction along an optical axis and in a second direction perpendicular to the first direction, an optical head having at least an objective lens, a semiconductor laser element, and a photodetector, for performing at least one of an operation of information recording on the optical recording medium and an operation of information reproduction from the optical recording medium, said optical head driving apparatus comprising:

a pair of suspensions serving as cantilevers for connecting said optical head to a supporting head such that said optical head is in a floating state, said suspensions being coupled to said optical head at two mutually facing positions, wherein each of said suspensions comprises a rectangular metal flame formed of a pair of first plate spring portions defined in a plane perpendicular to said second direction and a pair of second plate spring portions defined in a plane perpendicular to said first direction, and a number of through holes are formed in said first and second plate spring portions in order to allow said first and second plate spring portions to have a decreased flexural rigidity, and wherein each of said suspensions has spring constants different from each other in said first and second directions, such that the spring constant in said second direction is greater than the spring constant in said first direction, in order to decrease a tilt of said optical head due to angular moments in said first and second directions, and a difference between the spring constants in said first and second directions is set to fall in a range of from 10% to 40%.

\* \* \* \* \*